United States Patent
Maeda

(10) Patent No.: US 9,338,417 B2
(45) Date of Patent: May 10, 2016

(54) IMAGE PROJECTING SYSTEM, MASTER APPARATUS, IMAGE PROJECTING APPARATUS, AND IMAGE PROJECTING METHOD

(71) Applicant: Mitomo Maeda, Kanagawa (JP)

(72) Inventor: Mitomo Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/686,312

(22) Filed: Apr. 14, 2015

(65) Prior Publication Data

US 2015/0296192 A1    Oct. 15, 2015

(30) Foreign Application Priority Data

Apr. 15, 2014   (JP) ................................ 2014-083606

(51) Int. Cl.
  *H04N 3/22* (2006.01)
  *H04N 3/26* (2006.01)
  *H04N 9/31* (2006.01)

(52) U.S. Cl.
  CPC .................................. *H04N 9/3179* (2013.01)

(58) Field of Classification Search
  USPC ......... 348/745, 744, 716, 714, 706, 522, 553, 348/567, 189, 181, 180, 175, 135; 382/199, 382/275, 293; 709/208, 211; 708/200
  See application file for complete search history.

(56) References Cited

U.S. PATENT DOCUMENTS

| | | | | |
|---|---|---|---|---|
| 8,144,200 B2* | 3/2012 | Yoon | ...................... | G09G 3/006 348/180 |
| 8,789,952 B2* | 7/2014 | Okamoto | ............. | H04N 9/3182 345/589 |
| 2002/0107922 A1* | 8/2002 | Nakamura | .......... | H04L 41/0253 709/205 |
| 2005/0271299 A1* | 12/2005 | Ajito | ....................... | G06T 3/005 382/293 |
| 2007/0097213 A1* | 5/2007 | Ajito | ........................ | G01J 3/50 348/189 |
| 2007/0132893 A1* | 6/2007 | Miyazawa | ........... | H04N 9/3194 348/745 |
| 2007/0282932 A1* | 12/2007 | Rhim | .................... | G06F 13/385 708/200 |
| 2009/0273681 A1* | 11/2009 | Border | ............... | H04N 5/23212 348/189 |
| 2011/0242332 A1* | 10/2011 | McFadyen | ........... | H04N 9/3185 348/189 |
| 2012/0007985 A1* | 1/2012 | Inui | ....................... | G06T 7/0018 348/148 |
| 2013/0057707 A1* | 3/2013 | Hasegawa | ............ | H04N 9/3194 348/189 |
| 2013/0315489 A1* | 11/2013 | Uchiyama | ............. | G06T 7/0085 382/199 |
| 2014/0098244 A1* | 4/2014 | Ghazizadeh | ....... | H04N 5/44508 348/189 |
| 2014/0125819 A1* | 5/2014 | Tokunaga | .......... | H04N 13/0246 348/188 |
| 2014/0240492 A1* | 8/2014 | Lee | ...................... | H04N 5/2256 348/136 |
| 2014/0347497 A1* | 11/2014 | Fukuchi | ............... | H04N 9/3147 348/180 |

FOREIGN PATENT DOCUMENTS

| | | |
|---|---|---|
| JP | 2005-150818 | 6/2005 |
| JP | 2013-074539 | 4/2013 |

* cited by examiner

*Primary Examiner* — Jefferey Harold
*Assistant Examiner* — Mustafizur Rahman
(74) *Attorney, Agent, or Firm* — Harness, Dickey & Pierce, P.L.C.

(57) ABSTRACT

An image projecting system includes a master apparatus and an image projecting apparatus connected through a network. The master apparatus generates a correction parameter for correcting distortion caused in captured calibration image data of the image projecting apparatus, using the captured calibration image data and characteristic information of the image projecting apparatus. The image projecting apparatus corrects distortion using the correction parameter generated by the master apparatus to project a corrected projection image on the projection surface.

17 Claims, 7 Drawing Sheets

FIG. 4
| DEVICE TYPE | RESOLUTION | ASPECT RATIO | THROW RATIO | OFFSET |
|---|---|---|---|---|
| PJ1 | 1024 * 768 | 4 : 3 | 1.1 | 0.9 |
| PJ2 | 1280 * 720 | 16 : 9 | 1.2 | 1.1 |
| PJ3 | 1024 * 768 | 4 : 3 | 1.4 | 1.1 |
| ... | ... | ... | ... | ... |
| PJ10 | 1366 * 768 | 16 : 9 | 1.5 | 1.2 |
FIG. 5A
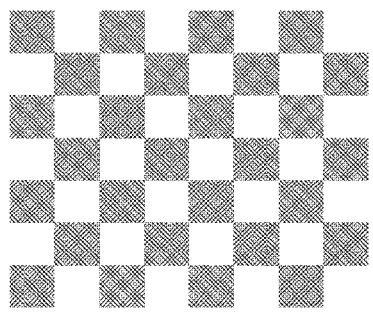
FIG. 5B
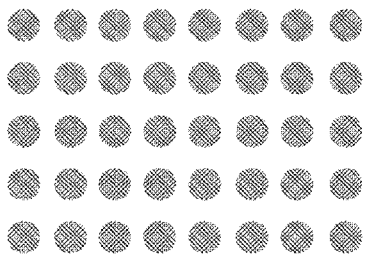

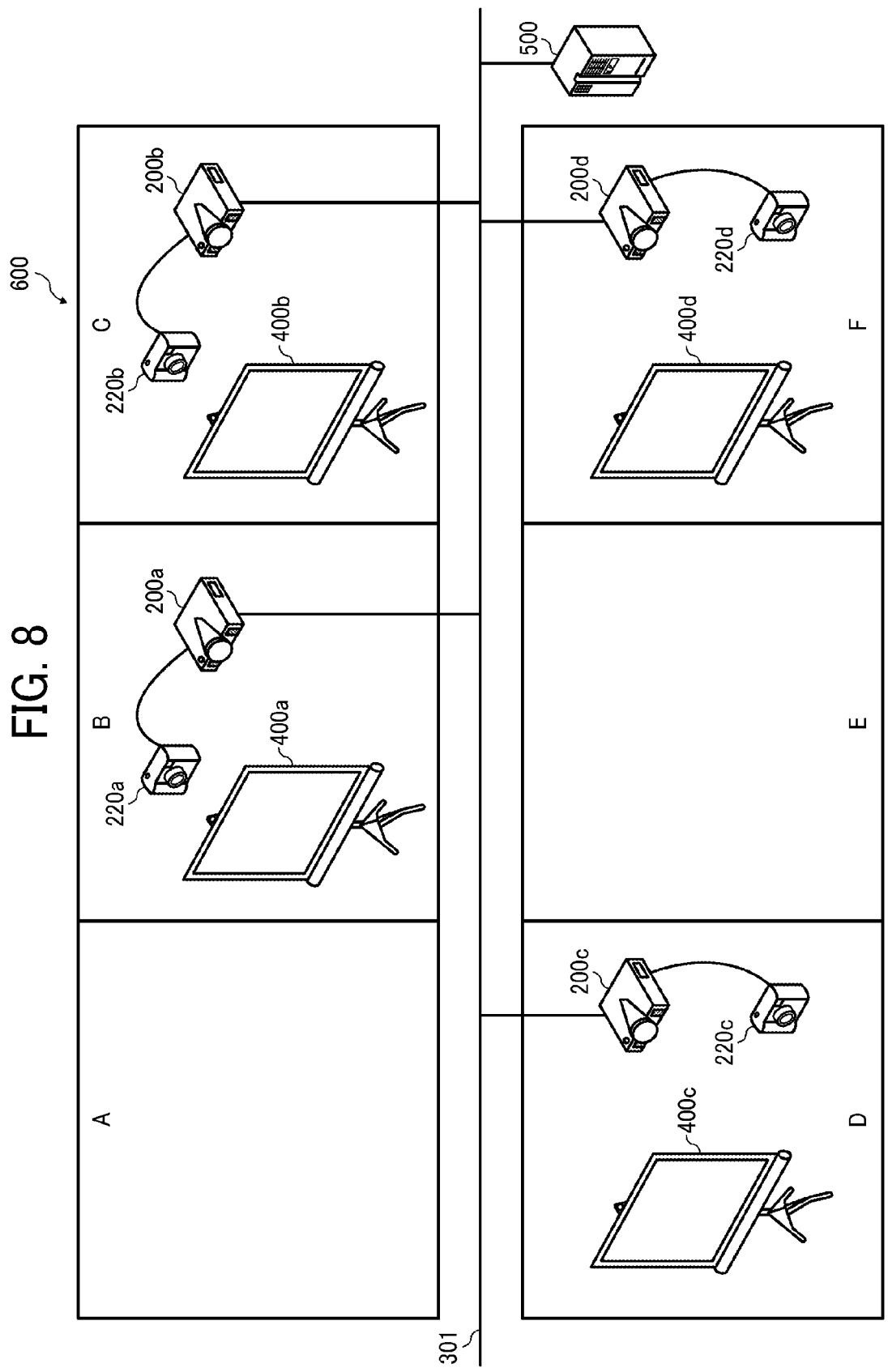

IMAGE PROJECTING SYSTEM, MASTER APPARATUS, IMAGE PROJECTING APPARATUS, AND IMAGE PROJECTING METHOD

CROSS-REFERENCE TO RELATED APPLICATIONS

This patent application is based on and claims priority pursuant to 35 U.S.C. §119(a) to Japanese Patent Application No. 2014-083606, filed on Apr. 15, 2014, in the Japan Patent Office, the entire disclosure of which is hereby incorporated by reference herein.

BACKGROUND

1. Technical Field

The present invention relates to an image projecting system. More specifically, the present invention relates to an image projecting system that corrects distortion of images projected by an image projecting apparatus.

2. Description of the Related Art

The projectors, which are widely used as image projecting apparatuses, have recently improved in resolution of liquid crystal panels, brightness of light source accompanied by increased efficiency in lamps, lowering the cost, and so on. For example, a compact and lightweight image projecting apparatus using a digital micro-mirror device (DMD) has spread and become widely used in homes as well as offices and schools.

Such an image projecting apparatus projects images on a projection surface, such as a screen. However, a wall or the like may also be used as the projection surface, which may be sometimes distorted like a curved surface. Further, the image projecting apparatus may sometimes be placed while being tilted relative to the projection surface. In such case, a resulting image may be affected by a trapezoidal distortion, depending on a relative relation between the projection light axis of the image projecting apparatus and the projection surface. In particular, an ultra short throw image projecting apparatus is vulnerable to flexure of the projection surface, as even a small flexure of the screen is emphasized, such that distortion correction is required.

In view of the above, a projector system that uses a personal computer capable of correcting distortion has been known. The projector obtains data of tilt angles in vertical and/or horizontal directions between the projection surface and the projection light axis. The personal computer corrects video data output from the projector based on the tilt angle data sent by the projector, and outputs the corrected video data to the projector.

Meanwhile, simplified functions and lower cost have been desired for the image projecting apparatus. For example, if the projector includes a tilt sensor (acceleration sensor), a light intensity measuring sensor, etc. for distortion correction, the simplification or the lower cost would not be realized.

SUMMARY

Example embodiments of the present invention include an image projecting system in which a master apparatus and an image projecting apparatus are connected through a network. The master apparatus generates a correction parameter for correcting distortion caused in captured calibration image data of the image projecting apparatus, using the captured calibration image data and characteristic information of the image projecting apparatus. The image projecting apparatus corrects distortion using the correction parameter generated by the master apparatus to project a corrected projection image on the projection surface.

Example embodiments of the present invention include a master apparatus and an image projecting apparatus in the image projecting system, a method performed by the master apparatus, a method performed by the image projecting apparatus, and an image projection control program stored in a non-transitory recording medium.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 illustrates an example of a device-specific information table;

FIG. 5A illustrates a lattice type test pattern image;

FIG. 5B illustrates a test pattern image in which circles are arranged in a lattice;

FIG. 8 is an explanatory diagram illustrating use of the image projecting system of FIG. 7.

Figure 1:
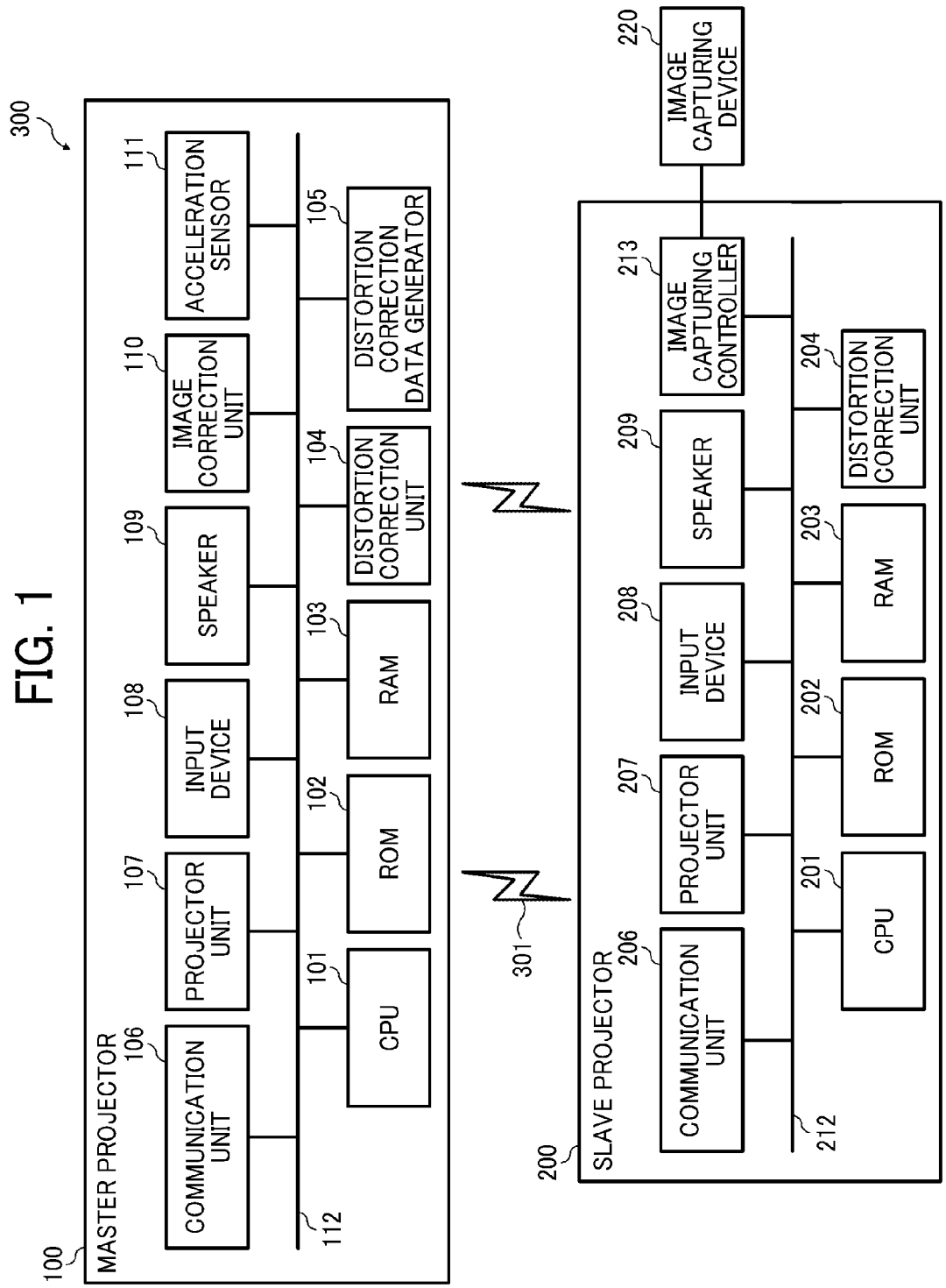
FIG. 1 is a block diagram illustrating a structure of an image projecting system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The structure according to embodiments of the present invention will be described below referring to FIGS. 1 to 8.

First Embodiment

An image projecting system (image projecting system 300) according to the present embodiment includes a master apparatus (master projector 100), and an image projecting apparatus (slave projector 200) that projects an image to a projection surface (screen 400). The master apparatus and the image projecting apparatus are communicably connected with each other. In such an image projecting system, the master apparatus includes a correction parameter generator (distortion correction data generator 105) that generates a correction parameter for correcting distortion according to captured image data (captured test pattern image data) of calibration image (test pattern image) projected by the image projecting apparatus and characteristic information (device-specific information) of the image projecting apparatus. The image projecting apparatus includes a distortion correction unit (distortion correction unit 204) that corrects distortion detected from a projected image according to the correction parameter generated by the master apparatus. As used herein, figures and terms in parentheses represent reference numbers and examples of application of the present embodiment.

The master apparatus also includes an image converting unit (image correction unit 110) and an image transmitting unit (communication unit 106). The image projecting apparatus also includes an information transmitting unit (communication unit 206) and an image projecting unit (projector unit 207). The information transmitting unit (communication unit 206) sends the characteristic information of the image projecting apparatus to the master apparatus. According to the received characteristic information, the image converting unit (image correction unit 110) converts a stored calibration image. The image transmitting unit (communication unit 106) sends the converted calibration image to the image projecting apparatus. The image projecting unit (projector unit 207) projects the received calibration image to a projection surface. The correction parameter generation unit (distortion correction data generator 105) obtains captured image data provided by capturing the calibration image projected on the projection surface, and generates the correction parameter according to the captured image data and the characteristic information. The correction parameter transmitting unit (communication unit 106) sends the correction parameter to the image projecting apparatus. The distortion correction unit (distortion correction unit 204) corrects distortion of the projected image according to the received correction parameter.

<Structure of Image Projecting System>

FIG. 1 is a block diagram illustrating a hardware structure of an image projecting system according to the present embodiment.

An image projecting system 300 includes an image projecting apparatus serving as a master apparatus (hereinafter referred to as master projector 100), and an image projecting apparatus serving as a slave apparatus (hereinafter referred to as slave projector 200). The master projector 100 and the slave projector 200 are connected with each other via a network 301. An image capturing device 220 is coupled with the slave projector 200. Although the example illustrated in FIG. 1 includes only one slave projector 200, more than one slave projectors 200 may be provided for one master projector 100.

The master projector 100 includes a central processing unit (CPU) 101, a read only memory (ROM) 102, a random access memory (RAM) 103, a distortion correction unit 104, a distortion correction data generator 105, a communication unit 106, a projector unit 107, an input device 108, a speaker 109, an image correction unit 110, and an acceleration sensor 111. These constituent elements are connected with one another via a bus 112.

The CPU 101 is connected to each unit of the master projector 100 to control the entire apparatus and perform various calculations. The ROM 102 is a memory that stores a test pattern image (calibration image) used in the distortion correction, a device-specific information table (which will be described later), image data, such as a user logo, capable of being registered by a user, device-specific information specific to the projector, various control programs, etc. The RAM 103 is a memory that temporarily stores data to be used for processing. The RAM 103 may be implemented by a synchronous dynamic RAM (SDRAM), a non volatile RAM (NVRAM), etc.

The communication unit 106 allows wireless communication using such as Bluetooth (registered trademark), Wi-Fi (registered trademark), etc., for example, to communicate data with the slave projector 200. The communication unit 106 may be connected to, for example, a LAN cable to perform wired communication with the slave projector 200.

The input device 108 receives input from an external device, such as a remote controller, or from an operation unit provided on the outer surface of the body of the apparatus. The speaker 109 is a voice output unit that outputs voice after converting the input voice data by digital to analog (D/A) conversion.

The acceleration sensor 111 is a sensor used for distortion correction and detects a tilt of the master projector 100 in the gravity direction. The acceleration sensor 111 may also include an image capturing unit that captures an image projected by the projector unit 107.

The distortion correction data generator 105 generates correction data for the distortion correction (correction parameter (correction table)). To correct self-distortion (of the master projector 100), the distortion correction data generator 105 generates data for correcting the distortion of the master projector 100 according to the detection result of the acceleration sensor 111. A method of generating the correction parameter by the master projector 100 for correcting the self-distortion according to the detection result of the acceleration sensor 111 is not particularly limited, and any known method can be used. When the image capturing unit is provided, the correction parameter may be generated according to the captured test pattern image data or the like of the test pattern image that has been captured by the image capturing unit.

The distortion correction data generator 105 generates a correction parameter for correcting distortion of each slave projector 200 (which will be described later in detail).

The image correction unit 110 converts the test pattern image so as to match the resolution and the aspect ratio for the specific slave projector 200, and transfers the converted test pattern image to the slave projector 200.

The distortion correction unit 104 corrects distortion of the image projected by the projector unit 107 using the correction parameter generated by the distortion correction data generator 105. The projector unit 107 projects the image obtained by correcting the distortion to the projection surface.

Still referring to FIG. 1, the slave projector 200 includes a CPU 201, a ROM 202, a RAM 203, a distortion correction unit 204, a communication unit 206, a projector unit 207, an input device 208, a speaker 209, and an image capturing controller 213. These constituent elements are connected with one another via a bus 212. In this example, the CPU 201, the ROM 202, the RAM 203, the distortion correction unit 204, the communication unit 206, the projector unit 207, the input device 208, and the speaker 209 are similar in function to the CPU 101, ROM 102, RAM 103, distortion correction unit 104, communication unit 106, projector unit 107, input device 108, and speaker 109, respectively. The constituent elements similar to those in the master projector 100 will not be described again.

The test pattern image is not stored in the ROM 202. The ROM 202 stores therein the image data, such as a user logo, capable of being registered by a user, device-specific information specific to the projector, various control programs, etc.

The image capturing controller 213 controls the image capturing device 220, such as a digital camera, connected to the slave projector 200 via a wired or wireless network, and causes the image capturing device 220 to capture images at predetermined timing. The image data captured by the image capturing device 220 is input to the slave projector 200. A smartphone, a tablet, etc. may be used as the image capturing device 220.

The slave projector 200 has a simplified structure in that the constituent elements equivalent to the distortion correction data generator 105, the image correction unit 110, and the acceleration sensor 111 of the master projector 100 that are provided in the master projector 100 are excluded. Accordingly, the image projecting apparatus is provided at lower cost. Since the acceleration sensor 111 and the distortion correction data generator 105 are not provided, the distortion correction processing of the projected image cannot be performed by the slave projector 200 alone.

The communication unit 106 of the master projector 100 and the communication unit 206 of the slave projector 200 can send and receive various types of data via the network 301. For example, a test pattern image that is stored in the ROM 102 of the master projector 100 may be transferred to the slave projector 200 and is temporarily stored in the RAM 202 before being projected. The image data such as a user logo can also be transferred.

<Use of Image Projecting System>

Figure 2:
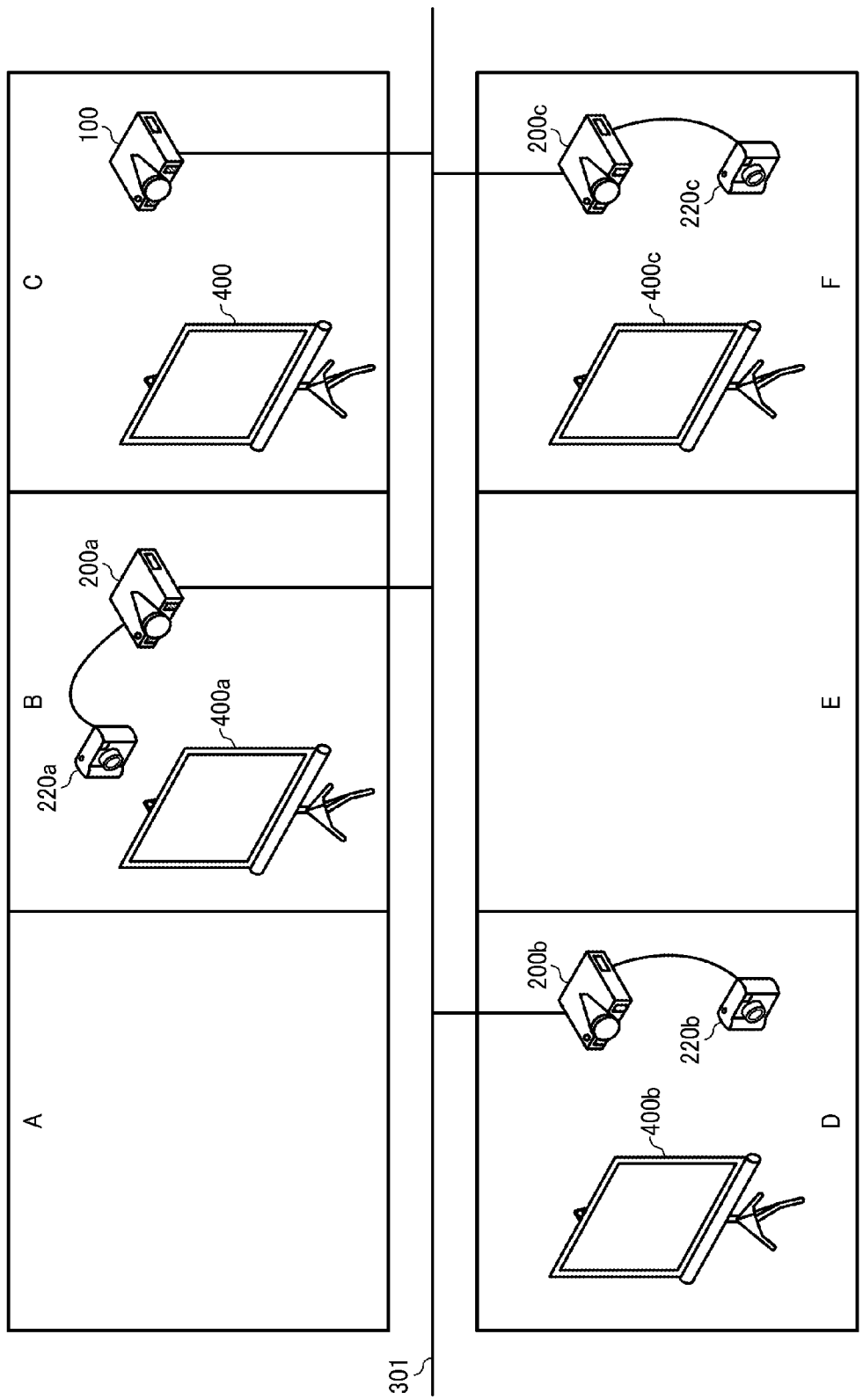
FIG. 2 is an explanatory diagram illustrating use of the image projecting system of FIG. 1.

FIG. 2 is an explanatory diagram illustrating example use of the image projecting system 300. In the example illustrated in FIG. 2, projectors and screens 400 are arranged in classrooms B, C, D, and F, respectively, among classrooms A to F. The projectors are connected with one another via a local area network (LAN) 301.

In this case, the projector placed in the classroom C is the master projector 100, while slave projectors 200a, 200b, and 200c are placed in the classrooms B, D, and F, respectively.

Image capturing devices, such as digital cameras 220a, 220b, and 220c are connected to the slave projectors 200a, 200b, and 200c, respectively, in order to capture images projected on the screens 400a, 400b, and 400c by the slave projectors 200a, 200b, and 200c, respectively.

Referring to FIG. 2, distortion correction processing executed by the image projecting system 300 will be briefly described below.

In the image projecting system 300, the test pattern image is sent to each of the slave projectors 200a, 200b, and 200c from the master projector 100.

Next, the slave projectors 200a, 200b, and 200c project the received test pattern images on the screens 400a, 400b, and 400c, respectively. With the test pattern images being projected, the image capturing devices 220a, 220b, and 220c capture images of the screen 400a, 400b, and 400c, respectively.

Image data of the test pattern image (hereinafter referred to as the captured test pattern image data) captured by the image capturing devices 220a, 220b, and 220c is sent to the master projector 100 via the network 301.

The master projector 100 generates correction parameters for correcting distortion for the respective slave projectors according to the captured test pattern image data and the characteristic information (the throw ratio, the offset value) of the slave projectors 200a, 200b, and 200c. The generated correction parameters are then sent to the slave projectors 200a, 200b, and 200c.

The slave projectors 200a, 200b, and 200c correct the distortion using the received correction parameters and project the corrected images on the projection surface. The master projector 100 projects the image on the screen 400 and corrects distortion based on the result of detection output by, for example, the acceleration sensor 111.

<Distortion Correction Processing of the Image Projecting System>

Figure 3:
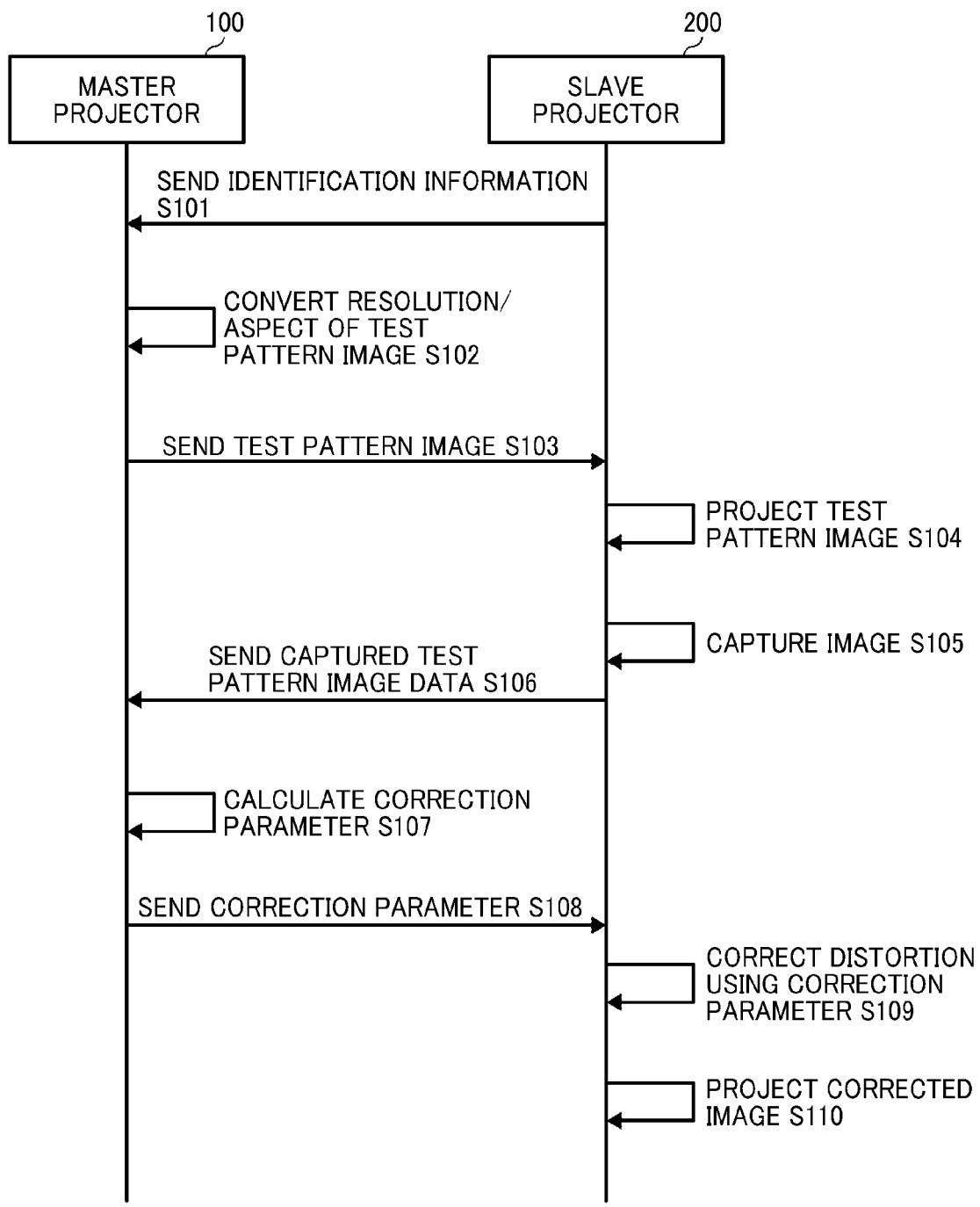
FIG. 3 is a sequence diagram illustrating operation of correcting distortion, performed by the image projecting system of FIG. 1.

FIG. 3 is a sequence diagram illustrating operation of correcting distortion, performed by the image projecting system 300, according to an example embodiment of the present invention.

First, the slave projector 200 sends identification information for identifying the slave projector 200 to the master projector 100 via the network 301 (S101). In this case, the identification information includes, for example, device type information of the slave projector 200, identification (ID) of the projector in the system, etc.

The master projector 100 stores in the ROM 102 device-specific information in the form of a table, as illustrated in FIG. 4. The device-specific information table stores the resolution, the aspect ratio, the throw ratio (which is represented by a horizontal measurement of the screen divided by a projection distance), the offset value (driving angle), etc. of the projectors for each type of the projectors. In this example, the throw ratio and the offset value are specific to each device type.

In the master projector 100 that has received the identification information from the slave projector 200, the image correction unit 110 reads the resolution and aspect ratio corresponding to the device-type of the projector 200, and converts the resolution and the aspect ratio of the test pattern image stored in the ROM 102 to match the slave projector 200 (S102).

The test pattern image to be used may be a latticed pattern as illustrated in FIG. 5A, or circles arranged in a lattice as illustrated in FIG. 5B. The test pattern image is compared with a captured image of the test pattern to detect distortion.

Next, the master projector 100 sends the converted test pattern image to the slave projector 200 via the network 301 (S103).

The projector unit 207 of the slave projector 200 projects the converted test pattern image received from the master projector 100 on the screen 400 (S104).

The image capturing controller 213 of the slave projector 200 also controls the image capturing device 220 to capture the test pattern image projected on the screen 400, and obtains captured image data (captured test pattern image data) (S105). For example, the image capturing controller 213 sends a request for capturing the test pattern image projected on the screen 400, and receives the captured test pattern image data from the image capturing device 220.

The slave projector 200 sends the captured test pattern image data to the master projector 100 (S106), for example, through the communication unit 206 via the network 301.

The distortion correction data generator 105 of the master projector 100 then calculates the correction parameter as the distortion correction data for the slave projector 200 according to a comparison result between the captured test pattern image data sent from the slave projector 200 and the test pattern image, the throw ratio, the offset value, etc., of the slave projector 200 (S107). A calculation algorithm for obtaining the distortion correction data according to the captured test pattern image data, the throw ratio and the offset value, etc. is not particularly limited and may comply with any known method. The calculated correction parameter is stored in the memory such as the ROM 102 or RAM 103 in association with the identification information of the slave projector 200.

The master projector 100 sends the correction parameter generated by the distortion correction data generator 105 to the slave projector 200 (S108).

The distortion correction unit 204 of the slave projector 200 performs distortion correction on the projected image using the received correction parameter (S109). The projector unit 207 projects the corrected image (S110).

<Distortion Correction by the Slave Projector>

Figure 6:
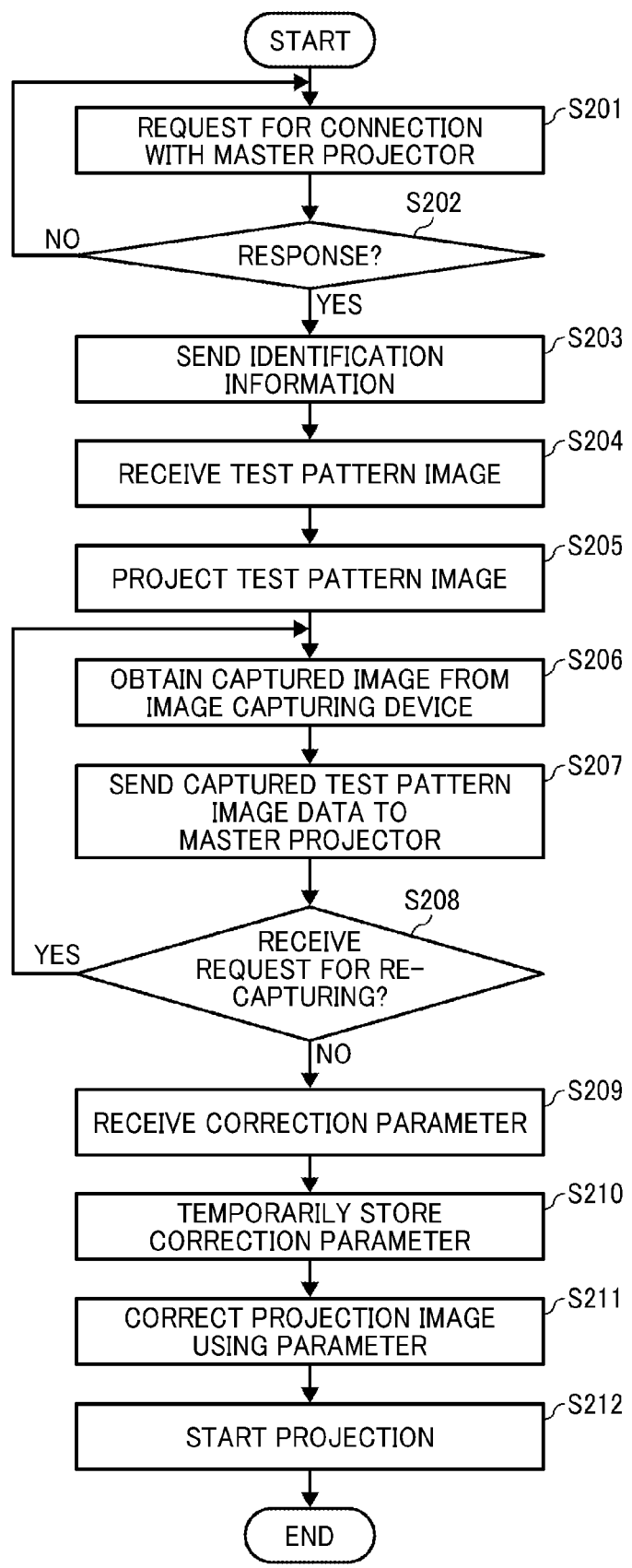
FIG. 6 is a flowchart illustrating operation of correcting distortion, performed by a slave projector of the image projecting system of FIG. 1.
Figure 7:
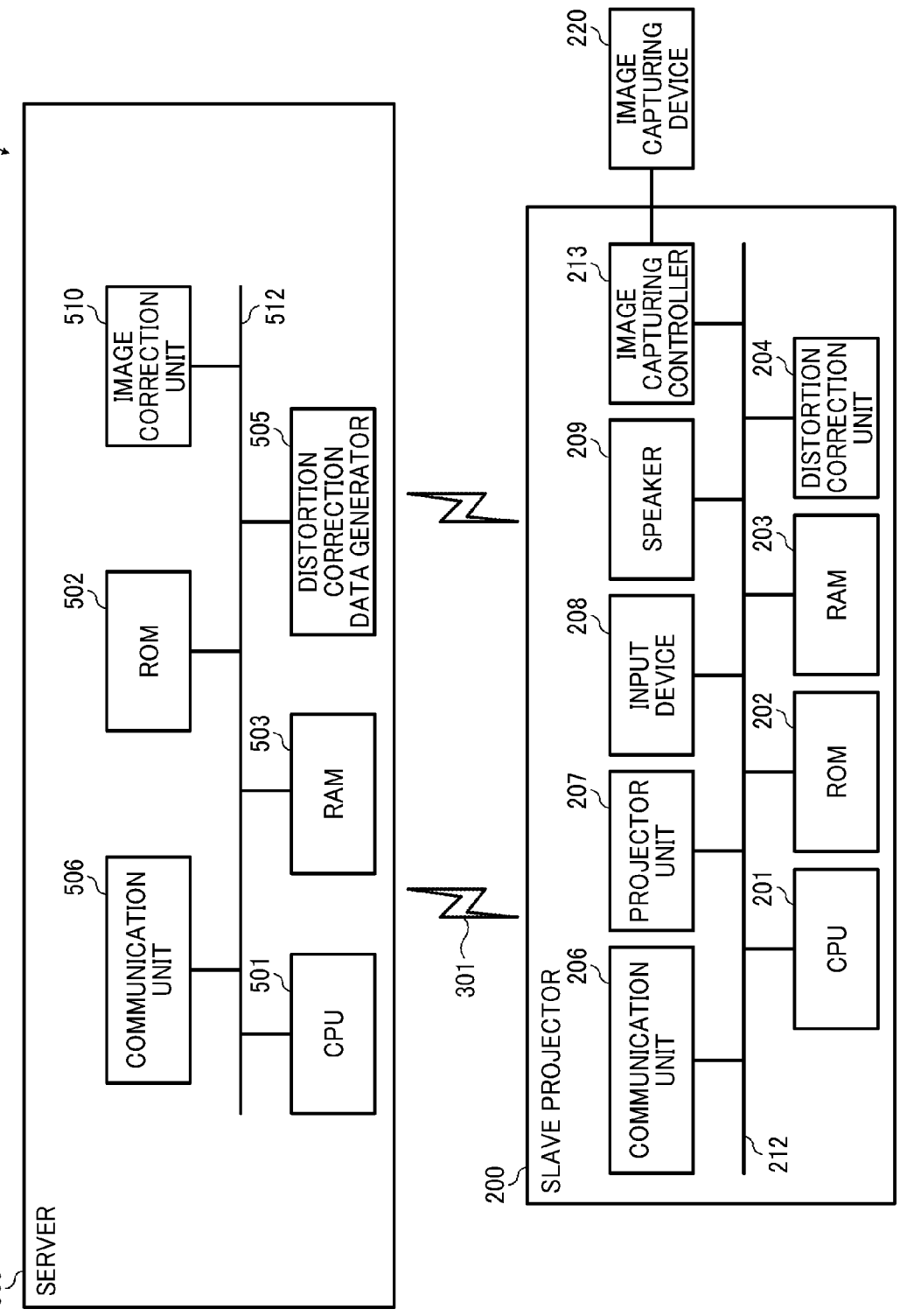
FIG. 7 is a block diagram illustrating a structure of an image projecting system, according to an example embodiment of the present invention.

FIG. 6 is a flowchart illustrating operation of correcting distortion performed by the slave projector 200, according to an example embodiment of the present invention.

First, the communication unit 206 of the slave projector 200 sends a request for connection with the master projector 100 (S201). It is then determined whether there is a response (S202). If there is no response (S202: No), the request for connection is resent (the process returns to S201).

In contrast, if there is a response (S202: Yes), the identification information is sent to notify the master projector 100 of the device type of the slave projector 200 (S203).

Next, the test pattern image that has been converted by the master projector 100 according to the resolution/aspect ratio of the slave projector 200 is received (S204), and the test pattern image is projected (S205) by the projector unit 207.

Accordingly, the test pattern image projected by the image capturing devices 220 is captured, and the image capturing controller 213 obtains the captured test pattern image data (S206). The captured test pattern image data is then sent to the master projector 100 (S207).

As described above, the master projector 100 calculates the correction parameter for correcting the distortion according to the device-specific information table and the captured test pattern image data. If, however, characteristics information, for example, could not be extracted from the captured test pattern image data and if the correction parameter could not be calculated, the slave projector 200 receives a request for re-capturing from the master projector 100 (S208: Yes). In this case, the test pattern image is captured again (and the process returns to S206).

If the request for re-capturing is not received (S208: No), the correction parameter is received from the master projector 100 (S209).

The received correction parameter is temporarily stored in the RAM 203 (S210), and the image is corrected using the corrected parameter by the distortion correction unit 204 (S211). The projector unit 207 projects the corrected image (S212).

Conventionally, the image projecting apparatus that performs distortion correction includes the tilt angle measuring unit, such as the acceleration sensor. However, the image projecting apparatus (slave projector) of the image projecting system according to the present embodiment requests the master apparatus (master projector) connected through a network to perform distortion correction.

The image projecting apparatus (slave projector), therefore, does not need to include a sensor for correcting distortion, a calculation unit that calculates the distortion correction parameter, etc., and can achieve a simple structure in which only the received correction parameter is applied while the image is projected. Accordingly, the cost of the image projecting apparatus can be reduced. The simple structure can also be achieved by not storing the test pattern image and using the external image capturing device as the image capturing unit for capturing the projected test pattern image.

In the above embodiment, the image capturing device 220 has been illustrated as being connected external to the slave projector 200. The slave projector 200, however, may include the image capturing device 220 inside as an image capturing unit.

In the above embodiment, the image capturing device 220 has also been illustrated as the image capturing apparatus that is connected externally to the slave projector 200. The image capturing device 220, however, may be directly connected to the network 301 using a built-in camera installed in, for example, a smartphone or a tablet capable of wireless communication as the image capturing device 220.

In this case, the test pattern image captured by the image capturing device 220 can be sent directly to the master projector 100 without using the slave projector 200. By providing information (e.g., the ID of the slave projector 200) for identifying from which slave projector 200 the captured test pattern image is projected, the master projector 100 can determine from which slave projector 200 the projected image is provided.

In the above embodiment, it has been illustrated that the device-specific information table storing the resolution, the aspect ratio, the throw ratio, the offset value, etc. in association with one another for each device type of the slave projector 200 is stored in advance in the ROM 102 of the master projector 100. Instead, the master projector 100 may not initially include the device-specific information table.

In this case, when the slave projector 200 sends the identification information (device type information, identification ID) to the master projector 100 (S101 in FIG. 3), the resolution, the aspect ratio, the throw ratio, and the offset value of the slave projector 200 itself are sent together with the identification information, such that the master projector 100 may receive and store such information to generate device-specific information table. The device-specific information may not necessarily sent in this case.

In this structure, it is not necessary to store the device-specific information table in the ROM 102 of the master projector 100, such that new device type can be added thereto.

When the resolution and aspect ratio settings of the slave projector 200 are changeable, such changes can be handled by sending them simultaneously with the identification information.

In the above embodiment, it has been illustrated that the correction parameter for distortion correction is calculated from the captured test pattern image data, the throw ratio, and the offset value. It would also be preferable, however, that the characteristic information (e.g., resolution of the captured image) of the image capturing device 220 may be sent while the captured test pattern image data is sent to the master projector 100. Accordingly, the characteristic information of the image capturing apparatus can also be considered when the correction parameter is calculated. The correction parameter can be calculated at a higher accuracy as a result of consideration of the characteristic of the image capturing device.

Second Embodiment

An image projecting system according to another embodiment of the present invention will be described below. The constituent elements similar to those in the above embodiment will not be described again.

<Structure of the Image Projecting System>

In the first embodiment, it has been illustrated that the master projector 100 is used as the master apparatus. The master projector 100 itself includes the unit (the distortion correction unit 104, the acceleration sensor 111) for correcting own distortion such that the image can be projected from the projector unit 107 after the distortion has been corrected. Alternatively, the master apparatus may not have the image projecting function, and an information processing apparatus such as a server apparatus having the structure related to the distortion correction for the slave projector 200 may be used. In other words, the structure may include an information processing apparatus, such as server apparatus, as a virtual projector.

In the present embodiment, an example of using a server 500 as the master apparatus is described. An image projecting system 600 includes a server 500 as the master apparatus and a slave projector 200. The server 500 and the slave projector 200 are connected with each other via the network 301. An image capturing device 220 is coupled with the slave projector 200.

The server 500 includes a CPU 501, an ROM 502, an RAM 503, a distortion correction data generator 505, a communication unit 506, and an image correction unit 510. These constituent elements are connected one another via a bus 512.

The CPU 501 is connected to each unit of the server 500 to control the entire apparatus. The ROM 502 is a memory that stores a test pattern image or the like. The RAM 103 is a memory that temporarily stores data to be used for each processing.

The communication unit 506 performs data communication with the slave projector 200 via wired/wireless communications.

The distortion correction data generator 505 generates the correction parameter for the distortion correction of the slave projector 200.

The image correction unit 510 converts the test pattern image so as to match the resolution and aspect ratio of the slave projector 200, to generate the converted test patter image for transmission to the slave projector 200.

The slave projector 200 and the image capturing device 220 are similar to those of the first embodiment.

The communication unit 506 of the server 500 and the communication unit 206 of the slave projector 200 can send and receive various types of data via the network 301.

<Use of the Image Projecting System>

FIG. 8 is an explanatory diagram illustrating an example use of the image projecting system 600. In the example illustrated in FIG. 8, slave projectors 200a, 200b, 200c, and 200d and screens 400a, 400b, 400c, and 400d are arranged in classrooms B, C, D, and F, respectively, among classrooms A to F, with the projectors being connected with one another via the LAN network 301 to the server 500.

Image capturing devices, such as digital cameras 220a, 220b, 220c, and 220d are connected to the slave projectors 200a, 200b, 200c, and 200d, respectively, in order to capture images projected on the screens 400a, 400b, 400c and 400d by the slave projectors 200a, 200b, 200c, and 200d, respectively.

Referring to FIG. 8, distortion correction processing performed by the image projecting system 600 will be briefly described below.

In the image projecting system 600, the test pattern image stored in the ROM 502 of the server 500 is sent to each of the slave projectors 200a, 200b, 200c, and 200d.

Next, the slave projectors 200a, 200b, 200c, and 200d project the received pattern images on the screens 400a, 400b, 400c, and 400d, respectively. With the test pattern images being projected on the screens 400a, 400b, 400c, and 400d by the slave projectors 200a, 200b, 200c, and 200d, the image capturing devices 220a, 220b, 220c, and 220d capture images of the screen 400a, 400b, 400c, and 400d, respectively.

The captured test pattern image data captured by the image capturing devices 220a, 220b, 220c, and 220d are sent to the server 500 via the network 301.

The server 500 generates correction parameters for correcting distortion for the respective slave projectors according to the captured test pattern image data and the performance (the throw ratio, the offset value) of the slave projectors 200a, 200b, 200c, and 200d. The generated correction parameters are then sent to the slave projectors 200a, 200b, 200c, and 200d.

The slave projectors 200a, 200b, 200c, and 200d project the corrected images, which are corrected using the received correction parameters. Details of distortion correction processing are similar to those of the first embodiment.

The image projecting system according to the second embodiment includes the server 500 as a virtual projector, although the master projector 100 is not included. Accordingly, the correction parameter for correcting the distortion of the slave projectors 200 can be generated in the server 500 and applied to each slave projector 200. As the image projecting apparatus, therefore, only the image projecting apparatus can be used to provide the image projecting system having a simplified structure. In addition, the image projecting system can be provided at a low cost.

The embodiments having been described above are preferable examples to implement the present invention, but the embodiments of the present invention are not limited thereto and various modifications are possible without departing from the scope of the present invention.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In one example, the present invention may reside in: an image projecting method, performed by a master apparatus connected to an image projecting apparatus through a network, the method including: receiving captured calibration image data of the image projecting apparatus; generating a correction parameter for correcting distortion caused in the captured calibration image data, using the captured calibration image data and characteristic information of the image projecting apparatus; and causing the image projecting apparatus to correct distortion using the correction parameter generated by the master apparatus to project a corrected projection image on a projection surface.

The method further includes: receiving identification information of the image projecting apparatus from the image projecting apparatus; converting calibration image data stored in a memory according to the characteristic information of the image projecting apparatus that is obtained using the received identification information of the image projecting apparatus, to generate converted calibration image data; and transmitting the converted calibration image data to the image projecting apparatus to cause the image projecting apparatus to project a calibration image based on the converted calibration image data on the projection surface.

The method further includes: storing in the memory device-specific information specific to the image projecting apparatus in association with identification information for identifying the image projecting apparatus, the device-specific information including a resolution, a throw ratio, and an offset value of the image projecting apparatus; and obtaining device-specific information associated with the identification information of the image projecting apparatus that is received from the image projecting apparatus, as the characteristic information of the image projecting apparatus.

The method further includes: receiving the device-specific information of the image projecting apparatus as the characteristic information, from the image projecting apparatus.

The method further includes: receiving the captured calibration image data from an image capturing device directly or indirectly.

The method further includes: receiving the characteristic information of the image capturing device. The correction parameter is calculated based on the captured calibration image data, the characteristic information of the image projecting apparatus, and the characteristic information of the image capturing device.

In another example, the present invention may reside in: an image projecting method, performed by an image projecting apparatus connected to a master apparatus through a network, the method including: sending captured calibration image data of the image projecting apparatus to the master apparatus; receiving a correction parameter for correcting distortion caused in the captured calibration image data generated by the master apparatus from the master apparatus, the correction parameter being generated by the master apparatus using the captured calibration image data and characteristic information of the image projecting apparatus; and correcting distortion using the correction parameter generated by the master apparatus to project a corrected projection image on the projection surface.

The invention claimed is:

1. An image projecting system, comprising:
a master apparatus; and
an image projecting apparatus connected to the master apparatus via a network and configured to project an image on a projection surface, wherein
the master apparatus includes:
   a communication unit that receives captured calibration image data of the image projecting apparatus; and
   a correction data generator that generates a correction parameter for correcting distortion caused in the captured calibration image data, using the captured calibration image data and characteristic information of the image projecting apparatus, and
the image projecting apparatus includes:
   a communication unit that receives the correction parameter generated by the master apparatus from the master apparatus; and
   a distortion correction unit that corrects distortion using the correction parameter generated by the master apparatus to project a corrected projection image on the projection surface.

2. The image projecting system of claim 1, wherein
the master apparatus further includes:
   an image converting unit that converts calibration image data stored in a memory according to the characteristic information of the image projecting apparatus that is obtained using identification information of the image projecting apparatus transmitted from the image projecting apparatus, to generate converted calibration image data for transmission to the image projecting apparatus, and the image projecting apparatus further includes:
an image projecting unit that projects a calibration image based on the converted calibration image data received from the master apparatus on the projection surface.

3. The image projecting system of claim 2, wherein
the master apparatus further includes the memory that stores, for each one of a plurality of image projecting apparatuses on the network, device-specific information specific to the image projecting apparatus in association with identification information for identifying the image projecting apparatus, the device-specific information including a resolution, a throw ratio, and an offset value of the image projecting apparatus, and the correction data generator obtains device-specific information associated with the identification information of the image projecting apparatus that is received from the image projecting apparatus, as the characteristic information of the image projecting apparatus.

4. The image projecting system of claim 3, wherein the identification information of the image projecting apparatus indicates a type of the image projecting apparatus.

5. The image projecting system of claim 2, wherein
the communication unit of the image projecting apparatus sends the device-specific information of the image projecting apparatus to the master apparatus as the characteristic information of the image projecting apparatus.

6. The image projecting system of claim 1, further comprising:
an image capturing device connected to the image projecting apparatus and configured to capture a calibration image projected on the projection surface,
wherein the image projecting apparatus obtains the captured calibration image data from the image capturing device and sends the captured calibration image data to the master apparatus.

7. The image projecting system of claim 1, further comprising:
an image capturing device connected to the master apparatus through a network and configured to capture a calibration image projected on the projection surface, and sends the captured calibration image data to the master apparatus through the network.

8. The image projecting system of claim 6, wherein
the master apparatus receives the characteristic information of the image capturing device, and
the correction data generator calculates the correction parameter, based on the captured calibration image data, the characteristic information of the image projecting apparatus, and the characteristic information of the image capturing device.

9. The image projecting system of claim 1, wherein the master apparatus is an image projecting apparatus configured to project an image on the projection surface.

10. The image projecting system of claim 1, wherein the master apparatus is a server apparatus.

11. A master apparatus connected to an image projecting apparatus through a network, the apparatus comprising:
a communication unit configured to receive captured calibration image data of the image projecting apparatus; and
a correction data generator that generates a correction parameter for correcting distortion caused in the captured calibration image data, using the captured calibration image data and characteristic information of the image projecting apparatus, wherein the communication unit sends the correction parameter to the image projecting apparatus to cause the image projecting apparatus to correct distortion using the correction parameter to project a corrected projection image on a projection surface.

12. The mater apparatus of claim 11, further comprising:
an image converting unit that converts calibration image data stored in a memory according to the characteristic information of the image projecting apparatus that is obtained using the identification information of the image projecting apparatus received from the image projecting apparatus, to generate converted calibration image data,
wherein the communication unit transmits the converted calibration image data to the image projecting apparatus to cause the image projecting apparatus to project a calibration image based on the converted calibration image data on the projection surface.

13. The apparatus of claim 12, further comprising:
the memory configured to store device-specific information specific to the image projecting apparatus in association with identification information for identifying the image projecting apparatus, the device-specific information including a resolution, a throw ratio, and an offset value of the image projecting apparatus,
wherein the correction data generator obtains device-specific information associated with the identification information of the image projecting apparatus that is received from the image projecting apparatus, as the characteristic information of the image projecting apparatus.

14. The apparatus of claim 12, wherein
the communication unit receives the device-specific information of the image projecting apparatus as the characteristic information, from the image projecting apparatus.

15. The apparatus of claim 11, wherein
the communication unit receives the captured calibration image data from an image capturing device directly or indirectly.

16. The apparatus of claim 15, wherein
the commination unit receives the characteristic information of the image capturing device, and
the correction data generator calculates the correction parameter, based on the captured calibration image data, the characteristic information of the image projecting apparatus, and the characteristic information of the image capturing device.

17. An image projecting apparatus connected to a master apparatus through a network, the apparatus comprising:
a communication unit that sends captured calibration image data of the image projecting apparatus to the master apparatus, and receives a correction parameter for correcting distortion caused in the captured calibration image data generated by the master apparatus from the master apparatus, the correction parameter being generated using the captured calibration image data and characteristic information of the image projecting apparatus; and
a distortion correction unit that corrects distortion using the correction parameter generated by the master apparatus to project a corrected projection image on a projection surface.

* * * * *